(12) United States Patent
Thomas

(10) Patent No.: US 7,354,060 B2
(45) Date of Patent: Apr. 8, 2008

(54) AIR BAG MODULE WITH LOW FORCE COVER OPENING

(75) Inventor: Scott D. Thomas, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 425 days.

(21) Appl. No.: 11/191,088

(22) Filed: Jul. 27, 2005

(65) Prior Publication Data

US 2007/0024034 A1 Feb. 1, 2007

(51) Int. Cl.
B60R 21/215 (2006.01)

(52) U.S. Cl. ............... 280/728.3; 280/731; 280/732

(58) Field of Classification Search ............ 280/728.2, 280/728.3, 731, 732
See application file for complete search history.

(56) References Cited

U.S. PATENT DOCUMENTS

| | | | | |
|---|---|---|---|---|
| 5,280,946 A * | 1/1994 | Adams et al. ............ | 280/728.2 |
| 5,284,358 A * | 2/1994 | Rhein ..................... | 280/728.2 |
| 5,407,226 A * | 4/1995 | Lauritzen et al. ........ | 280/728.1 |
| 5,415,428 A * | 5/1995 | Koide et al. ............. | 280/728.3 |
| 5,431,433 A * | 7/1995 | Steimke et al. .......... | 280/728.3 |
| 5,454,586 A * | 10/1995 | Rogerson ................. | 280/728.2 |
| 5,470,097 A * | 11/1995 | Elqadah et al. .......... | 280/728.3 |
| 5,470,101 A * | 11/1995 | Ennis ...................... | 280/728.2 |
| 5,474,325 A * | 12/1995 | Daines et al. ............ | 280/728.3 |
| 5,556,126 A * | 9/1996 | Lee .......................... | 280/728.3 |
| 5,704,635 A * | 1/1998 | Tajiri et al. .............. | 280/728.2 |
| 5,762,361 A * | 6/1998 | Herrmann et al. ....... | 280/728.2 |
| 5,762,362 A * | 6/1998 | Kikuchi et al. .......... | 280/728.3 |
| 5,791,680 A * | 8/1998 | Dyer ........................ | 280/728.3 |
| 5,794,968 A * | 8/1998 | Yamamoto et al. ...... | 280/728.2 |
| RE36,003 E * | 12/1998 | Sato ........................ | 280/728.3 |
| 5,904,367 A * | 5/1999 | Warnez et al. ........... | 280/728.3 |
| 6,053,528 A * | 4/2000 | Marx et al. .............. | 280/728.3 |
| 6,158,763 A * | 12/2000 | Dominique et al. ..... | 280/728.2 |
| 6,345,837 B1 * | 2/2002 | Warnez et al. ........... | 280/728.3 |
| 6,364,349 B1 * | 4/2002 | Kutchey et al. ......... | 280/730.2 |
| 6,422,591 B1 * | 7/2002 | Cuevas et al. ........... | 280/728.3 |
| 6,786,504 B2 * | 9/2004 | Lorenz et al. ........... | 280/728.2 |
| 6,837,514 B1 * | 1/2005 | Fujita et al. ............. | 280/731 |
| 7,104,566 B2 * | 9/2006 | Pinsenschaum et al. . | 280/728.3 |
| 2002/0005631 A1 * | 1/2002 | Varcus et al. ............ | 280/728.3 |
| 2002/0036397 A1 * | 3/2002 | Fujita et al. ............. | 280/731 |

\* cited by examiner

*Primary Examiner*—Christopher P. Ellis
*Assistant Examiner*—Timothy Wilhelm

(57) ABSTRACT

An air bag cover includes a mounting leg having an enlarged foot captured between the base plate and the inner plate. The base plate has a channel formed along its outer edge. The inner plate overlies the base plate and has an outer end portion that partially overlies the channel to capture and retain the foot of the mounting leg within the channel both prior to and upon opening movement of the air bag cover during air bag deployment. The base plate, the inner plate and the leg are configured such that the initial opening movement of the airbag cover is obtained by rotation of the enlarged foot within the channel, and then the continuing opening movement of the cover is obtained by bending of the mounting leg while the enlarged foot is constrained against further rotation within the channel. Auxiliary tear lines may be provided in the cover, particularly at or near the corners of an air bag flap to further enable low force opening of the cover.

15 Claims, 5 Drawing Sheets

AIR BAG MODULE WITH LOW FORCE COVER OPENING

FIELD OF THE INVENTION

The present invention relates to an air bag cover and, more particularly, an air bag cover having features that promote low force opening of the air bag cover to facilitate air bag deployment.

BACKGROUND OF THE INVENTION

It is well known that vehicle air bags are commonly constructed as a module that can be readily mounted on the steering wheel. The module includes a base plate and an inner plate that suitably mount the folded air bag and its inflator, as well as mounting a cover that covers and conceals the folded bag. The air bag cover is of molded elastomeric construction and is designed to tear and bend in a predictable manner to open and move out of the way upon inflation of the air bag. It is known to attach the air bag cover to the plate by attachment legs that are molded integral with the cover and to have the attachment legs captured between the base plate and the inner plate.

SUMMARY OF THE INVENTION

The present invention relates to an air bag module having features that promote low force tearing and opening movement of the air bag cover to facilitate air bag deployment.

The air bag module includes a base plate and an inner plate that are attached to one another. An air bag and an inflator are suitably mounted on the plates and an air bag cover of molded elastomeric material is provided to house the inflator and the folded up air bag. The air bag cover includes an outer surface that is grained and colored to match the vehicle interior. The cover includes a mounting leg that depends from the outer surface and is captured between the base plate and the inner plate. The base plate has a channel formed along the outer edge thereof and a flange portion defining the outer most end of the channel. The mounting leg of the cover has an enlarged foot seated within the channel. The inner plate generally overlies the base plate and has an outer end portion that partially overlies the channel to capture and retain the enlarged foot of the cover mounting leg within the channel both prior to and during opening movement of the air bag cover during air bag deployment. The base plate, the inner plate and the mounting leg are configured such that the initial opening movement of the airbag cover is obtained by rotation of the enlarged foot of the cover mounting leg within the channel, and then the continuing opening movement of the cover is obtained by bending of the mounting leg while the enlarged foot is constrained against further rotation within the channel. For example, the channel of the base plate may have a semi-circular cross section and the enlarged foot of the mounting leg of the cover may be of circular cross section so that the mounting leg of the cover is journalled for rotary movement. Or the flange portion of the outer most edge of the base plate may have a lip that engages with the mounting leg adjacent the foot, and the lip defines a pivot about which the mounting leg pivots during rotation of the mounting leg of the cover until the foot swings into engagement with the inner plate so that the further opening movement is obtained by bending of the mounting leg. Auxiliary tear lines may be provided in the cover, particularly at or near the corners of an air bag cover flap to further enable low force opening of the cover.

Further areas of applicability of the present invention will become apparent from the detailed description provided hereinafter. It should be understood that the detailed description and specific examples, while indicating the exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of the exemplary embodiment(s) is merely exemplary in nature and is in no way intended to limit the invention, its application, or uses.

Figure 1:
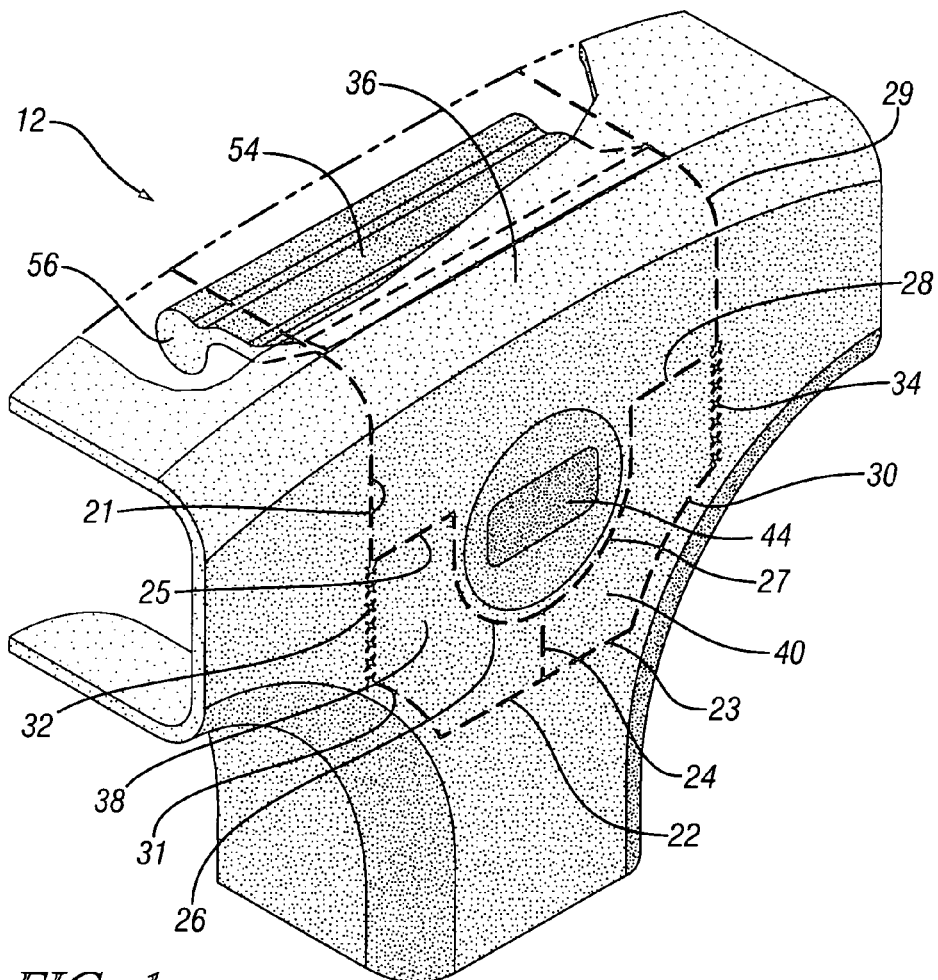
FIG. 1 is a perspective view of an air bag cover.
Figure 2:
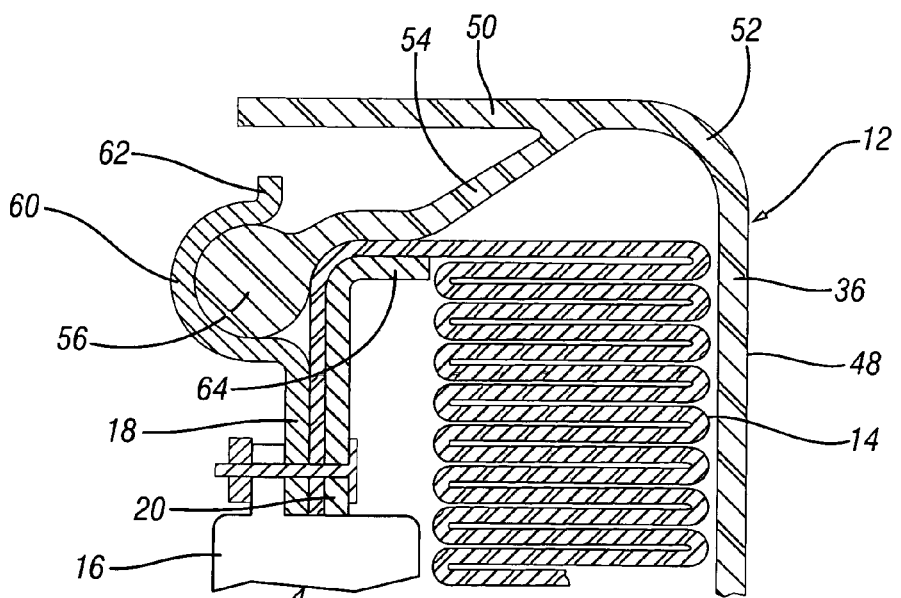
FIG. 2 is a section view taken through an air bag module having the cover of FIG. 1 also showing an upper flap of the cover having a mounting leg captured between a base plate and an inner plate.

Referring to FIGS. 1 and 2, an air bag module 10 is shown for mounting on the steering wheel of a vehicle. The air bag module 10 includes an air bag cover 12 of molded elastomeric construction, a folded up air bag 14, an inflator 16, a base plate 18, and an inner plate 20.

Referring to FIG. 1, it is seen that the cover 12 has tear lines represented by dashes, and hinge lines represented by x's. The tear lines and hinge lines are preferably invisible from the outer surface of the air bag cover, and may be created by any of the known prior art techniques, such as providing grooves in the backside of the cover, providing cuts or slots in the substrate material that may be embedded in the molded cover, etc. Upon inflation of the air bag, best seen in FIG. 8, the cover 12 tears at tear segments 21, 22, 23 24, 25, 26, 27, 28, 29, 30 and 31. And the cover also hinges at hinge segments 32 and 34. Thus, it is seen that the tear lines and hinge lines divide the air bag cover 12 into an upper flap 36, and left and right flaps 38 and 40 which need to move quickly away to enable unrestricted deployment of the air bag from the air bag module. An emblem 44 is securely attached to the upper flap.

Figure 3:
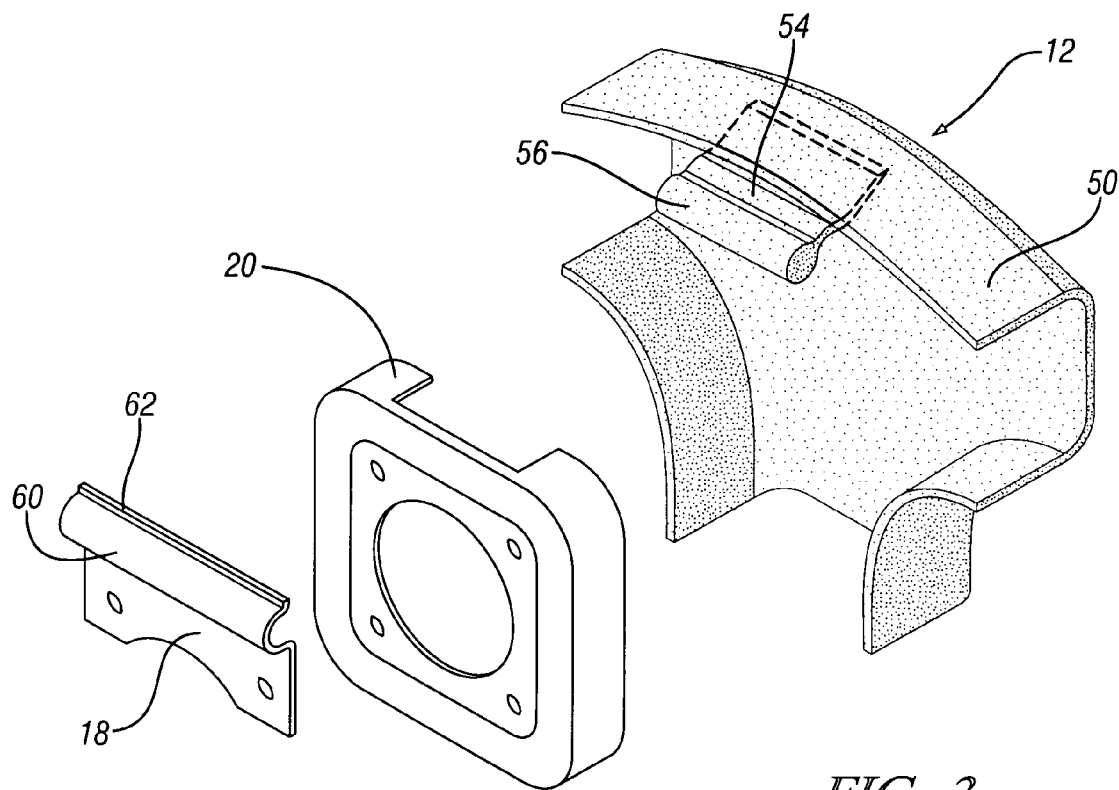
FIG. 3 is an exploded view showing parts of the cover and the base plate and inner plate.

Referring again to FIG. 2, the upper flap 36 includes a generally planar front face 48 and a skirt 50 that intersect at a corner 52. As seen in FIGS. 2 and 3, a mounting leg 54 is integrally molded with the flap 36 and depends from the skirt 50. The end of the mounting leg 54 carries an integrally molded enlarged foot 56. As seen in FIG. 2, the base plate 18 is of stamped steel construction, or is otherwise formed from molded plastic, aluminum, or magnesium, and has a channel 60 formed along the edge thereof. The outer lip of the channel 60 is formed by a flange 62. The enlarged foot 56 of the mounting leg 54 is seated within the channel 60. The inner plate 20 has an outer edge formed by a flange 64. The inner plate is suitably attached to the base plate 18 and partially overlies the width of the channel 60 so that the enlarged foot 56 of the mounting leg 54 is effectively captured within the channel 60. As seen in FIG. 2, the channel 60 follows a generally rounded contour in cross section and the foot 56 of the mounting leg is also of generally circular shape.

Figure 4:
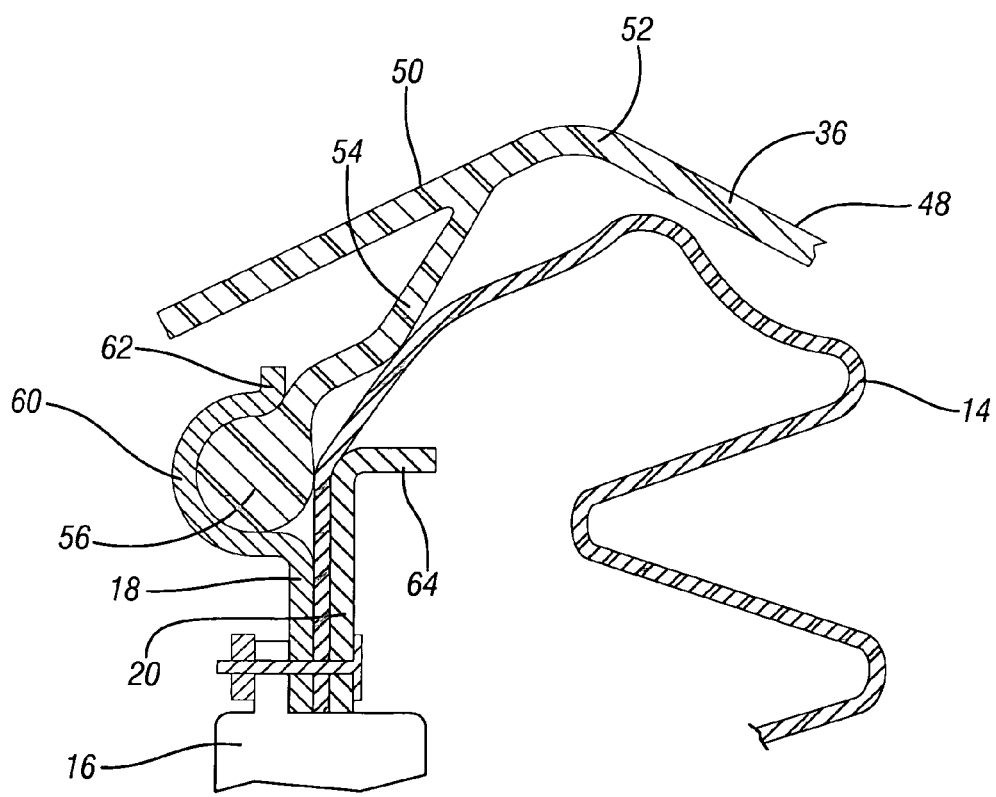
FIG. 4 shows initial opening movement of the upper flap of the cover via rotation of the mounting leg.
Figure 5:
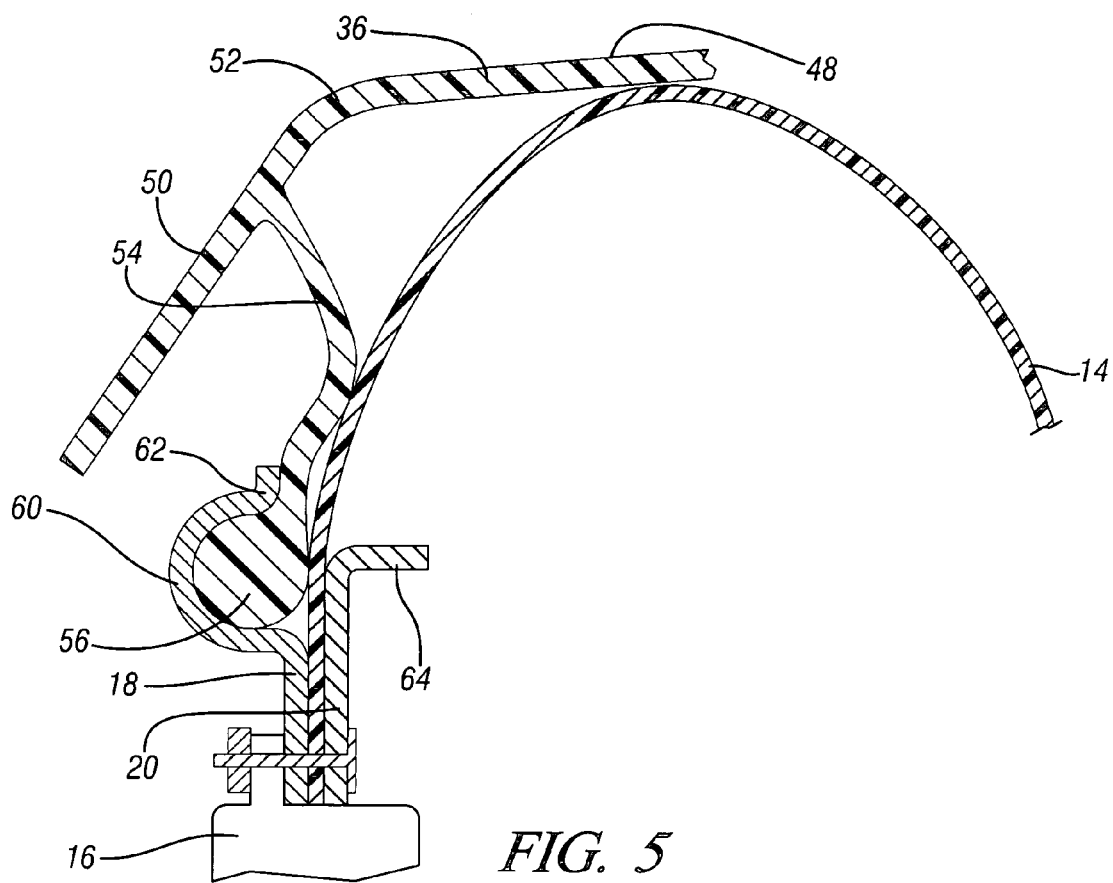
FIG. 5 shows further opening movement of the upper flap of the cover via bending of the mounting leg of the cover.
Figure 6:
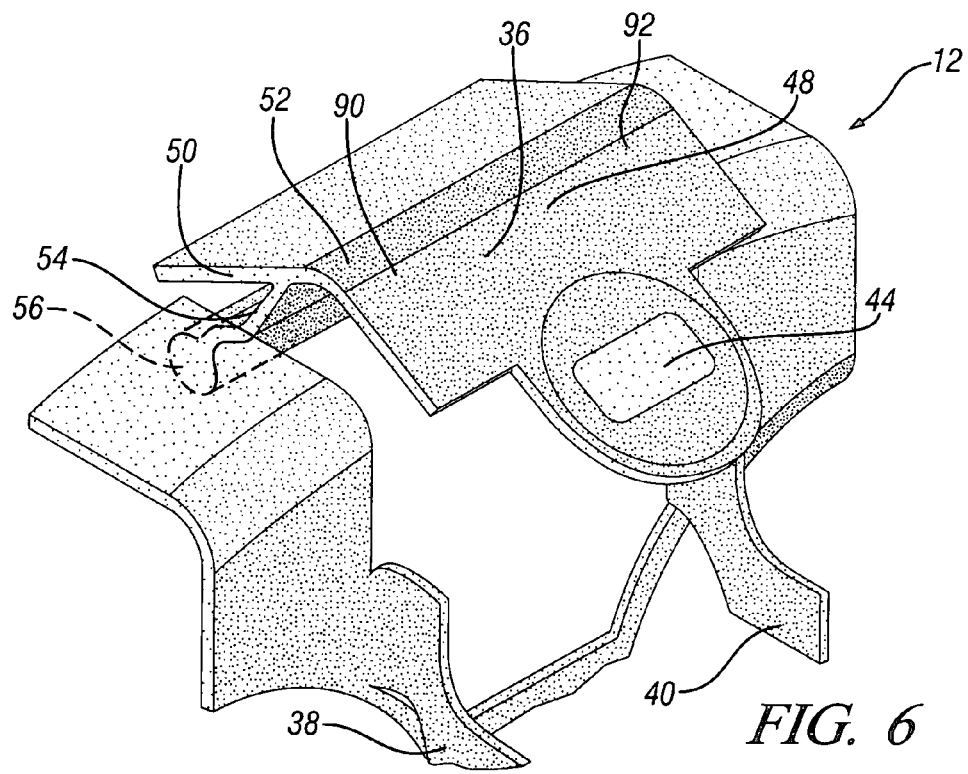
FIG. 6 is a perspective view showing the tearing and hinging of the upper flap of the cover during opening movement.

FIG. 4 shows the initial opening movement of the flap 36 upon inflation of the air bag, as permitted by the rotation of the foot 56 within the channel 60. FIG. 4 shows that this rotation proceeds until the flange 62 at the outer edge of the channel becomes engaged by the mounting leg 54. Upon such engagement, the rotation of the enlarged foot 56 is stopped, and the further opening movement of the cover flap 36 is permitted by the bending of the mounting leg 54 as shown in FIG. 5. FIG. 6 shows the flaps 36, 38 and 40 in their open positions.

FIGS. 2, 3 and 4 show that the air bag 14 is wrapped around the inner plate 20 and overlies the enlarged foot 56. However, it will be understood that the air bag may, as an alternative, be seated under the inflator 16 or under a separate additional inner plate rather than under the inner plate 20. Thus, it is understood that the presence or absence of the air bag in relation to the channel 60 is not of importance, so along as the fit of the enlarged foot 56 within the channel 60 is sufficiently free of friction or clamping effort to ensure that the enlarged foot 56 may rotate upon opening movement of the cover.

Figure 7:
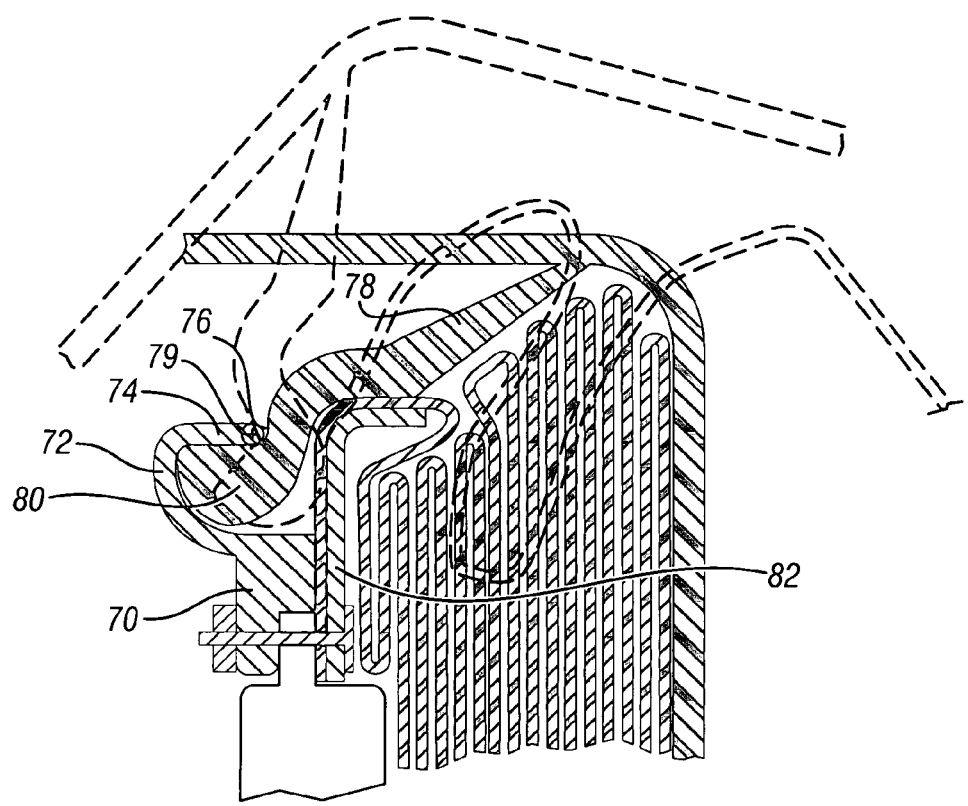
FIG. 7 is a section similar to FIG. 2 but showing different embodiment of the mounting leg and plates to establish a pivot for the rotation of the cover mounting leg.

FIG. 7 shows an alternative example of the mounting of the enlarged foot within the channel. In FIG. 7 the base plate 70 has channel 72 that is not of circular crossection and has an outer lip 74 that is engaged by an underside pocket 76 of the mounting leg 78 to define a pivot point 79 for the mounting leg 78. The enlarged foot 80 is shaped to have a dimension that cannot pass through the gap between the outer lip 74 and the overlying inner plate 82, and swings freely within the channel 72 during rotation of the mounting leg 78 with the cover. It will be appreciated that once the mounting leg 78 has rotated to the phantom line indicated position of FIG. 7, the enlarged foot 80 has been carried into contact with the inner plate 82, thereby stopping the mounting leg 78 against further rotation around the pivot point 79. Accordingly, the further opening movement of the upper flap will be obtained by the bending of the mounting leg 78, similar to the bending shown in FIG. 5.

Figure 8:
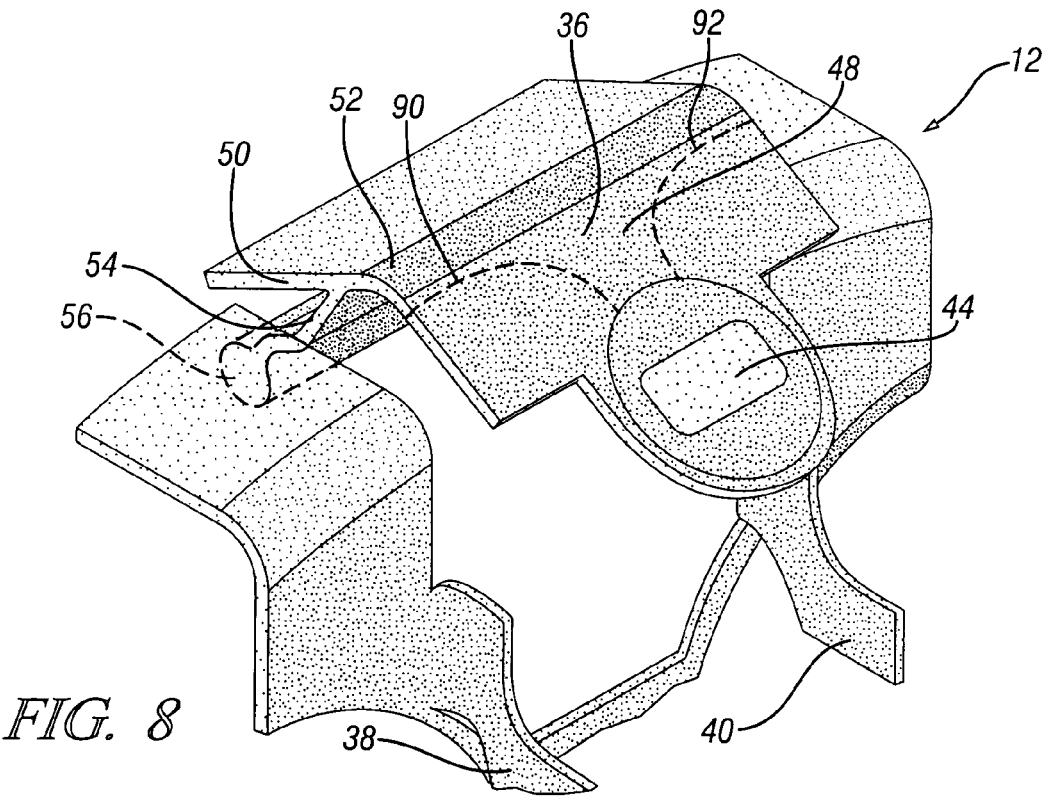
FIG. 8 is similar to FIG. 6 but shows that additional tear seams have been provided in the upper flap to further enable opening of the cover.
Figure 9:
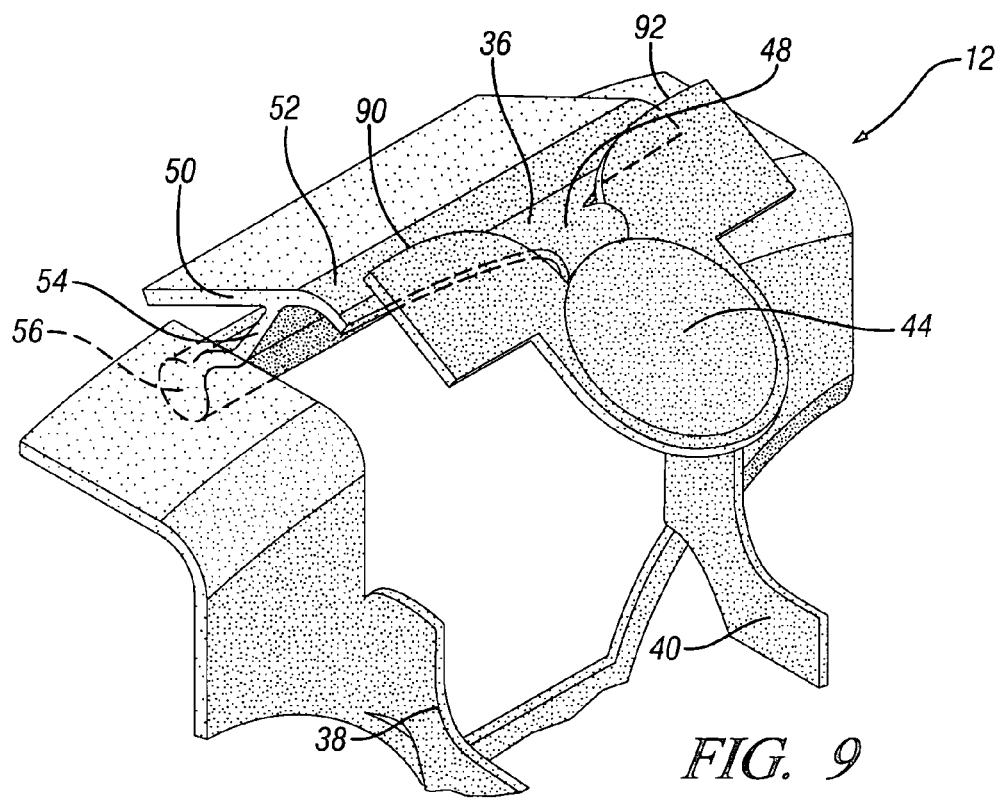
FIG. 9 shows the cover of FIG. 8 having opened and torn.

Referring to FIGS. 8 and 9, it is shown that the upper flap 36 may have additional tear lines 90 and 92 that proceed along the corner 52, or nearly adjacent the corner 52, from the side edges of the flap 36, and then turn toward the center of the air bag cover and the emblem 44. FIG. 9 shows the tearing of the tear lines 90 and 92 during air bag deployment. It will be appreciated that these auxiliary tear lines 90 and 92 are effective to ameliorate the stiffening effect provided by the corners 52 of the air bag cover.

Figure 10:
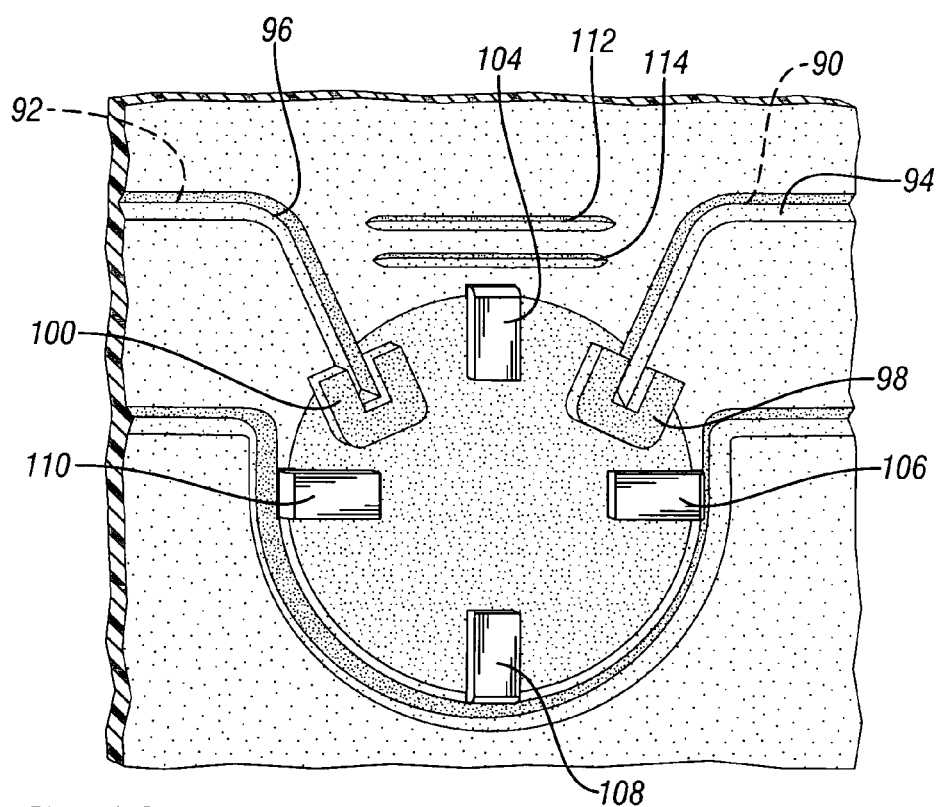
FIG. 10 shows the back side of the cover flap of FIG. 8 to depict the attachment of an emblem to the cover and the structure of the tear seams.

FIG. 10 shows the back side of the cover flap 36 and it is seen that the tear lines 90 and 92 are provided respectively by grooves 94 and 96 that are molded into the backside of the cover and will propagate the tear. The tear lines end at tear stops 98 and 100, which are thickened unshaped structures that effectively define the end of the tear lines 90 and 92 and stop the propagation of the tear. FIG. 9 also shows that the emblem 36 is fixedly attached to the flap 46 by metal tabs 104, 106, 108 and 110 that depend from the emblem 44 and reach through slots in the cover flap 36, and are then bent over to lie upon the back side of the cover flap. Although FIG. 9 shows the tear stops 98 and 100 as underlying the emblem, it will be understood that the grooves 94 and 96 may stop short of the emblem 44 so that the tears stops would not be located beneath the emblem 44.

FIG. 10 also shows the cover flap 36 can also be provided with auxiliary hinge lines via short grooves 112 and 114 that span between the grooves 94 and 96 to further promote low force opening of the cover flap 36.

The forgoing description of the invention is merely exemplary in nature and, thus, variations that do not depart from the spirit and scope of the invention are intended to be within the scope of the invention. For example, although FIG. 1 shows the air bag being of the so-called Y type of tear seam, it will be understood that the teachings of this invention may be employed on other air bag designs such as the H type, the I type, and other type of tear seams. In addition, it is possible to attach the emblem to other cover flaps than the upper cover flap. Finally, the cover flap features described herein may be implemented on cover flaps other than the upper flap, such as the lower flap.

What is claimed is:

1. An air bag module having a base plate and an inner plate that are attached to one another, and an air bag cover adapted to cover and conceal an inflator and a folded air bag, comprising:

the base plate having a channel formed along the outer edge thereof;

a mounting leg of the cover having an enlarged foot seated within the channel of the base plate;

the inner plate generally overlying the base plate and having an outer end portion that partially overlies the channel to capture and retain the enlarged foot of the cover mounting leg within the channel both prior to and upon opening movement of the air bag cover during air bag deployment;

and wherein the base plate and the inner plate and the mounting leg are configured such that the initial opening movement of the airbag cover is obtained by rotation of the enlarged foot of the cover mounting leg within the channel, and then the continuing opening movement of the cover is obtained by bending of the mounting leg while the enlarged foot is constrained against further rotation by the channel and the inner plate.

2. The air bag module of claim 1 further comprising the channel of the base plate having a semi-circular cross section and the enlarged foot of the mounting leg of the cover being of a general circular cross section so that the mounting leg of the cover is journalled for rotary movement.

3. The air bag module of claim 2 further comprising a flange on the base plate being engaged by the mounting leg upon rotary movement to stop the mounting leg to define the limit of rotation of the enlarged foot within the channel so that further opening movement of the cover is obtained by bending of the leg.

4. The air bag module of claim 1 comprising the flange portion of the outer most edge of the base plate having a lip engaging with the enlarged foot and the lip defining a pivot about which the mounting leg pivots during rotation of the mounting leg of the cover.

5. The air bag module of claim 1 in which the air bag cover includes a show surface facing the occupant and an integrally molded skirt portion that intersects with the show surface at a corner, and auxiliary tear lines are provided to extend generally along and adjacent the corners from opposing side edges of the cover flap to tear upon opening of the cover to reduce the stiffening effect of the corner and thereby further facilitate low force opening of the air bag cover.

6. The air bag module of claim 5 in which an emblem is attached to the show surface of the cover and the auxiliary tear lines end beneath the emblem.

7. The air bag module of claim 5 in which an emblem is attached to the show surface of the cover and the auxiliary tear lines do not extend beneath the emblem.

8. An air bag module having a base plate and an inner plate that are attached to one another, and an air bag cover adapted to cover and conceal an inflator and a folded air bag, comprising:

the base plate having a channel that follows a generally rounded contour formed along the outer edge thereof;

a mounting leg extending from the cover and having an enlarged foot of circular cross section seated within the channel, the inner plate having an outer end portion that partially overlies the channel to capture and retain the enlarged foot of the mounting leg within the channel for rotary movement during air bag deployment;

the outer most edge of the channel including a flange portion that becomes engaged by the mounting leg to define the limit of rotary moment of the enlarged foot within the channel so that further opening movement of the cover is obtained by bending of the mounting leg.

9. The air bag module of claim 8 in which the air bag cover includes a show surface facing the occupant and an integrally molded skirt portion that intersects with the show surface at a corner, and auxiliary tear lines are provided to extend generally along and adjacent the corners from opposing side edges of the cover flap to tear upon opening of the cover to reduce the stiffening effect of the corner and thereby further facilitate low force opening of the air bag cover.

10. The air bag module of claim 9 in which an emblem is attached to the show surface of the cover and the auxiliary tear lines end beneath the emblem.

11. The air bag module of claim 9 in which an emblem is attached to the show surface of the cover and the auxiliary tear lines do not extend beneath the emblem.

12. An air bag module having a base plate and an inner plate that are attached to one another, and an air bag cover adapted to cover and conceal an inflator and a folded air bag, comprising:

the base plate having a channel formed along the outer edge thereof and a flange portion defining the outer most end of the channel;

a mounting leg extending from the cover and having an enlarged foot seated within the channel of the base plate;

a lip defining the outer most end of the channel;

the mounting leg of the cover seated on the lip of the channel and having an enlarged foot located within the channel;

the inner plate having an outer end portion that partially overlies the channel to capture and retain the enlarged foot of the mounting leg within the channel for rotary movement during air bag deployment;

the channel being shaped and dimensioned relative the foot in a manner to enable a range of free swinging rotary movement of the foot within the channel about a pivot point established by the seating of the mounting leg upon the lip of the channel, until the swinging movement of the foot causes engagement of the foot with the inner plate to stop further movement of the foot so that the further opening movement of the cover is obtained by bending of the mounting leg.

13. The air bag module of claim 12 in which the air bag cover includes a show surface facing the occupant and an integrally molded skirt portion that intersects with the show surface at a corner, and auxiliary tear lines are provided to extend generally along and adjacent the corners from opposing side edges of the cover to tear upon opening of the cover to reduce the stiffening effect of the corner and thereby further facilitate low force opening of the air bag cover.

14. The air bag module of claim 13 in which an emblem is attached to the show surface of the cover and the auxiliary tear lines end beneath the emblem.

15. The air bag module of claim 13 in which an emblem is attached to the show surface of the cover and the auxiliary tear lines do not extend beneath the emblem.

* * * * *